(12) United States Patent
Kim et al.

(10) Patent No.: US 11,190,089 B2
(45) Date of Patent: Nov. 30, 2021

(54) COIL BANDING DEVICE FOR HAIRPIN TYPE STATOR COIL FORMING SYSTEM OF DRIVING MOTOR

(71) Applicants: HYUNDAI MOTOR COMPANY, Seoul (KR); KIA MOTORS CORPORATION, Seoul (KR)

(72) Inventors: Heewoong Kim, Ulsan (KR); Joook Park, Ulsan (KR); Jaehwan Lee, Gimhae-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/922,139

(22) Filed: Jul. 7, 2020

(65) Prior Publication Data

US 2021/0184548 A1 Jun. 17, 2021

(30) Foreign Application Priority Data

Dec. 13, 2019 (KR) .......................... 10-2019-0166728

(51) Int. Cl.
*H02K 15/04* (2006.01)
*B21D 7/00* (2006.01)

(52) U.S. Cl.
CPC .......... *H02K 15/0421* (2013.01); *B21D 7/00* (2013.01)

(58) Field of Classification Search
CPC .............................. H02K 15/0421; B21D 7/00
See application file for complete search history.

(56) References Cited

U.S. PATENT DOCUMENTS

| 10,052,670 | B2* | 8/2018 | Brewer, Jr. | ............... B21D 7/00 |
| 2017/0019003 | A1* | 1/2017 | Ponzio | ............... H02K 15/0421 |
| 2019/0109524 | A1* | 4/2019 | Watanabe | ............ H02K 15/067 |

FOREIGN PATENT DOCUMENTS

| JP | 2016-0131056 A | 7/2016 |
| KR | 2016-0131056 A | 11/2016 |

* cited by examiner

*Primary Examiner* — Peter Dungba Vo
*Assistant Examiner* — Jose K Abraham
(74) *Attorney, Agent, or Firm* — McDonnell Boehnen Hulbert & Berghoff LLP

(57) ABSTRACT

A coil banding device includes a tubular nozzle penetrating the central portion of the housing, the material coil being supplied therethrough, a nozzle moving member to move the nozzle, a banding member including a pair of roller members on an upper surface of the rotating member and sandwiching the material coil discharged from the nozzle to band in a set shape, a horizontal moving member for moving the banding member horizontally through a first plate slidably mounted to the housing, a vertical moving member for moving the banding member vertically through a second plate slidably mounted on the first plate, a first rotating member for rotating the banding means with respect to a horizontal axis through a third plate rotatably mounted on the second plate, and a second rotating member for rotating the banding member about a vertical axis by a planetary gear mounted on the second plate.

13 Claims, 10 Drawing Sheets

COIL BANDING DEVICE FOR HAIRPIN TYPE STATOR COIL FORMING SYSTEM OF DRIVING MOTOR

CROSS REFERENCE TO RELATED APPLICATIONS

This application claims priority to and the benefit of Korean Patent Application No. 10-2019-0166728 filed in the Korean Intellectual Property Office on Dec. 13, 2019, the entire contents of which are incorporated herein by reference.

BACKGROUND

(a) Field

The present disclosure relates to a coil banding device for hairpin type stator coil forming system. More particularly, the present disclosure relates to a coil banding device for hairpin type stator coil forming system that can improve the process flexibility by controlling the position of the nozzle and the banding means that are in direct contact with the material coil separately, and can be applied regardless of the shape and type of the stator coil.

(b) Description of the Related Art

In general, a hybrid vehicle called an eco-friendly vehicle or an electric vehicle may generate driving force by an electric motor (hereinafter referred to as a "driving motor") that obtains rotational power from electric energy.

The hybrid vehicle may be driven in an electric vehicle (EV) mode, which is a pure electric vehicle mode that uses only the power of the driving motor, or in a HEV (Hybrid Electric Vehicle) mode, which uses both the engine and the rotational power of the driving motor as a power source.

In addition, a general electric vehicle travels using the rotational force of a driving motor as a power source.

For example, most of the driving motors used as the power source of the eco-friendly vehicle use a permanent magnet synchronous motor (PMSM).

The driving motor as a permanent magnet-type synchronous motor used as a power source for an eco-friendly vehicle is basically a stator that generates magnetic flux, a stator and a rotor spaced at a predetermined gap, and installed in the rotor. It consists of permanent magnets.

Here, the stator has a plurality of slots formed on the inner circumferential side of the stator core, and a stator coil is wound in the slot.

Accordingly, when an alternating current is applied to the stator coil, a rotating magnetic field is generated in the stator, and rotation torque can be generated in the rotor by the rotating magnetic field.

The driving motor may be divided into a distributed winding type driving motor and a concentrated winding type driving motor according to the winding method of the stator coil, and among them, the stator of the distributed winding type drive motor may be classified into a segment coil stator or a distribution winding coil stator according to the coil winding method.

At this time, the segment coil stator is a stator of a method in which the coil is first formed into a predetermined shape and then inserted into a slot of the stator core. In addition, the distribution winding coil stator is a stator in which a coil bundle is inserted into a slot of the stator core.

Meanwhile, the output of the driving motor is known to be proportional to the number of turns of the coil wound on the stator core.

However, when the number of turns of the coil is increased, the size of the stator core and the driving motor inevitably increases, which makes it difficult to downsize the driving motor.

Accordingly, a method of increasing the spot ratio of the coil wound on the stator core may be considered in order to improve the output of the drive motor without increasing the size of the drive motor.

In other words, a dead space between the stator core and the winding coil or a method of increasing the coil area by minimizing the dead space between each coil may be considered.

In this context, instead of using an annular coil having a circular cross section (also referred to in the art as a "circular coil") as a coil winding in recent years, a flat coil (a square coil in the art) is also actively sought.

In the case of the flat coil, it is possible to reduce dead space and improve the spot ratio compared to the annular coil due to the cross-sectional shape.

However, in the case of the flat coil, there is a difficulty in coil winding work relative to the annular coil.

This is because, in the case of a flat coil, it is difficult to use a winding machine due to increased rigidity due to being manufactured in a larger cross-sectional area than an annular coil in order to maximize the spot ratio.

Accordingly, the following method has been proposed as a method of facilitating the coil winding operation of the square coil in the segment coil stator of the distributed winding type drive motor. That is, a plurality of separate hairpin type (approximately U- or V-shaped) stator coils (also referred to as "conductors" in the art) are inserted into each slot of the stator core. Then, the stator coils adjacent in the radial direction in the slot are welded. Then, a continuous coil winding of the stator core is formed.

A driving motor having a stator of a hairpin winding type manufactured in this way is also referred to as a "hairpin driving motor" in the art.

With the structure of the stator coil winding of the above-described hairpin driving motor, the limitation due to the winding machine is overcome, and even in the case of a square coil, coil winding work is relatively easy. In addition, it is possible to increase the coil area and realize a high-power and miniaturized motor.

On the other hand, in the process of molding the stator coil of the hairpin type as described above, it can be largely divided into a CNC (Computer Numerical Control) molding method and a press molding method, but the hairpin driving motor can be divided into several. Since there are different types of hairpins, it is advantageous to have a CNC molding method that can handle multiple types.

However, in the CNC molding method capable of supporting multi-species according to the prior art, the production speed of one hairpin is consumed for approximately 6 seconds, and thus the production speed is somewhat slow. Compared to the CNC molding method, it has twice the productivity, but there is a disadvantage that only a single model can be produced.

Accordingly, research and development of a method for forming the hairpin is necessary.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure improves process flexibility through individual position control of a nozzle and a banding means for forming a material coil, and also simplifies a structure for controlling the position of the nozzle and the banding means, and the shape and type of the stator coil. It is intended to provide a coil banding device for a hairpin-type stator coil forming system that can be applied irrespective of which can reduce investment and process costs.

According to one or a plurality of exemplary embodiments of the present disclosure, a coil banding device that bands a square material coil into a set shape in a hairpin type stator coil forming system includes a tubular nozzle disposed to penetrate the central portion of the horizontal direction of the housing, the material coil being supplied through the inside, a nozzle moving means connected to one end of the nozzle to move the nozzle in one direction, a banding means including a pair of roller members on an upper surface of the rotating member disposed corresponding to the other end of the nozzle, sandwiching the material coil discharged from the nozzle between the roller members to band in a set shape, a horizontal moving means for moving the banding means in a horizontal direction through a first plate slidably mounted to the housing, a vertical moving means for moving the banding means in a vertical direction through a second plate slidably mounted on the first plate, a first rotating means for rotating the banding means with respect to a horizontal axis through a third plate rotatably mounted on the second plate, and a second rotating means for rotating the banding means about a vertical axis by the operation of a planetary gear mounted on the second plate.

Further, the nozzle may be made of a hollow cylindrical inside so that the material coil is supplied therethrough.

Further, the nozzle moving means may include a moving means bracket configured on the front side of the housing, a moving means actuator mounted on the moving means bracket, and a connecting bracket mounted between the drive shaft of the moving means actuator and the front end of the nozzle and configured to slide the nozzle forward and backward along a connecting rail on the moving means bracket.

Further, the banding means may include a rotating member rotating about a vertical axis, a rotating member housing surrounding a certain section of the rotating member, and a pair of roller members disposed corresponding to the outlet of the nozzle through which the material coil is discharged, and sandwiched between the material coils to form a band in a set shape in a state mounted on the upper surface of the rotating member protruding a certain section from the rotating member housing.

Further, the horizontal moving means may include a first plate disposed at the rear of the housing and slidably mounted between the housing and the upper and lower rails, and a first actuator mounted on the housing and connected to the first plate through a fixed block mounted on a front end of the drive shaft, and moving the first plate in a horizontal direction.

Further, the vertical moving means may include a second plate disposed on the rear side of the first plate and slidably mounted between the first plate and the left and right rails, and a second actuator disposed on the upper side of the housing and connected to the second plate through a mounting bracket to move the second plate in a vertical direction.

Further, the vertical moving means may further include an auxiliary cylinder connected between the housing and the mounting bracket and applying a driving force to the second plate together with the second actuator.

Further, the first rotating means may include a disc-shaped third plate rotatably mounted to a central portion of the second plate, a rotating means housing having one end coupled to the rotating member housing surrounding the rotating member and the other end coupled to the third plate to rotate the banding means based on a vertical axis by rotation of the third plate, a third actuator mounted through a mounting bracket of the vertical moving means and having a first driving gear formed at a front end, and a first driven gear engaged with the first drive gear and coupled to the rear side of the third plate to rotate with the third plate by the first drive gear as the third actuator operates.

Further, as the third actuator operates, the first driven gear engaged with the first driving gear, the third plate coupled to the first driven gear, the rotating means housing coupled to the third plate, and the rotating member housing may rotate so that the banding means is moved relative to the horizontal axis.

Further, the first drive gear and the first driven gear may be planetary gears having different gear diameters.

Further, the second rotating means may include a horizontal driving unit disposed inside the rotating means housing, one end being passed through the rotating member housing and coupled with the rotating member, the sub driven gear being configured at the other end, a fourth actuator mounted through the mounting bracket and having a second driving gear formed at the front end, a second driven gear engaged with the second driving gear and disposed in front of the first driven gear, and a connecting driven gear formed smaller than the diameter of the second driven gear at the rear of the second driven gear, integrally formed with the second driven gear and penetrated inside the first driven gear, and engaged with the sub driven gear.

Further, the second rotating means may rotate the banding means about a vertical axis as the fourth actuator operates, while the horizontal driving unit rotates by the second driven gear engaged with the second driving gear, the connecting driven gear integrally formed with the second driven gear, and the sub driven gear engaged with the connecting driven gear.

Further, the second driving gear, the second driven gear, the sub driven gear, and the connecting driven gear may be planetary gears having different gear diameters.

The coil banding device for hairpin type stator coil forming system according to an exemplary embodiment of the present disclosure can improve process flexibility compared to the existing press forming method through individual position control of the nozzle and the banding means for forming the material coil.

In addition, the coil banding device for hairpin type stator coil forming system according to an exemplary embodiment of the present disclosure simplifies a structure for controlling the position of the nozzle and the banding means and can be applied regardless of the shape and type of the stator coil, thereby reducing investment and process cost.

In addition, effects obtained or predicted by embodiments of the present disclosure will be disclosed directly or implicitly in the detailed description of the embodiments of the present disclosure. That is, various effects predicted according to embodiments of the present disclosure will be disclosed within a detailed description to be described later.

DETAILED DESCRIPTION

Figure 1:
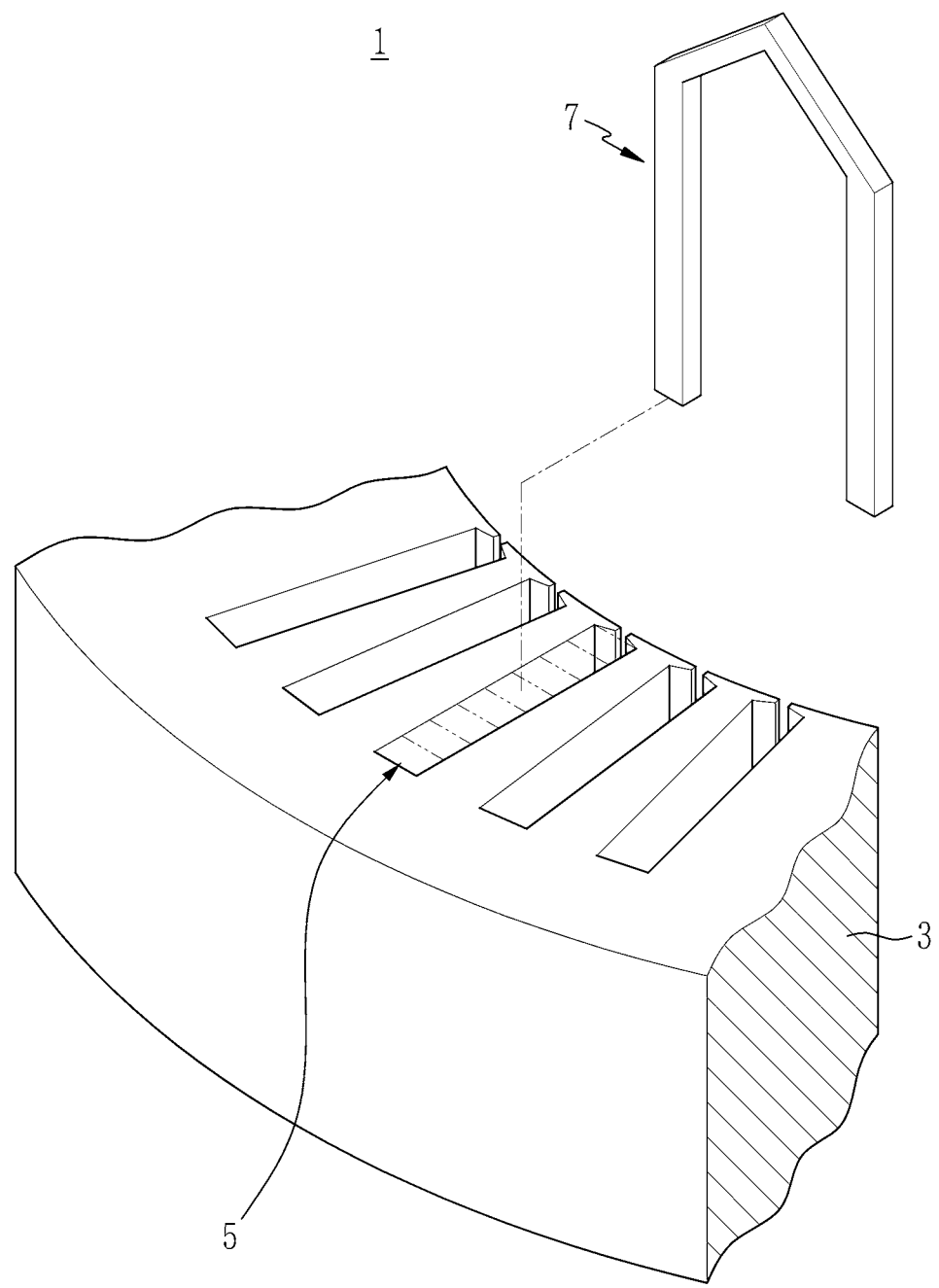
FIG. 1 is a view schematically showing a structure of a hairpin winding type stator of a driving motor applied to an embodiment of the present disclosure.

Hereinafter, the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly describe the present disclosure, parts irrelevant to the description are omitted, and the same reference numerals are applied to the same or similar elements throughout the specification.

In the following description, dividing names of components into first, second, and the like is to divide the names because the names of the components are the same as each other, and an order thereof is not particularly limited.

FIG. 1 is a view schematically showing a structure of a hairpin winding type stator of a driving motor applied to an embodiment of the present disclosure.

Referring to FIG. 1, the hairpin winding type stator 1 of the driving motor applied to the exemplary embodiment of the present disclosure is an eco-friendly vehicle and may be applied to a driving motor for a hybrid vehicle and/or an electric vehicle that obtains driving force with electric energy.

For example, the driving motor may be applied to a permanent magnet synchronous motor (PMSM).

The driving motor includes a stator 1 according to an embodiment of the present disclosure, a rotor (not shown) disposed with a certain gap with the stator 1, and a plurality of permanent magnets (not shown) installed on the rotor.

In the above, the stator 1 includes a stator core 3 in which a plurality of electrical steel sheets are stacked. Then, the stator core 3 is wound through a plurality of slots 5 through a hairpin type stator coil 7 (commonly referred to as a "conductor" in the art).

In addition, the rotor includes a rotor core in which a plurality of electrical steel sheets are stacked in an axial direction.

The permanent magnet mentioned above is inserted and installed in the insertion holes provided in the rotor core.

Here, the drive motor may be applied to a synchronous motor of a proton-type type with a rotor disposed inside the stator 1, or may be applied to a synchronous motor of an abduction type with a rotor disposed outside of the stator 1.

As described above, the stator coils 7 of the hairpin type are flat coils, for example, having a pair of legs and generally provided as a U-shaped or V-shaped hairpin type, and may be provided as a square-shaped square coil.

These hairpin-type stator coils 7 are inserted into the set layer of the slot 5 in the stator core 3 (indicated by dashed lines in the drawing), and an end portion of the pair of legs protrudes out of the slot 5, and the protruding portions can be welded to form an electrically connected coil winding.

Although the embodiment of the present disclosure has been described as applying the hairpin winding type to a stator in a driving motor employed in an eco-friendly vehicle as described above, the protection scope of the present disclosure is not necessarily understood as being limited thereto, and various types and uses of the drive motor having a hairpin type stator of the technical concept of the present disclosure can be applied.

Figure 2:
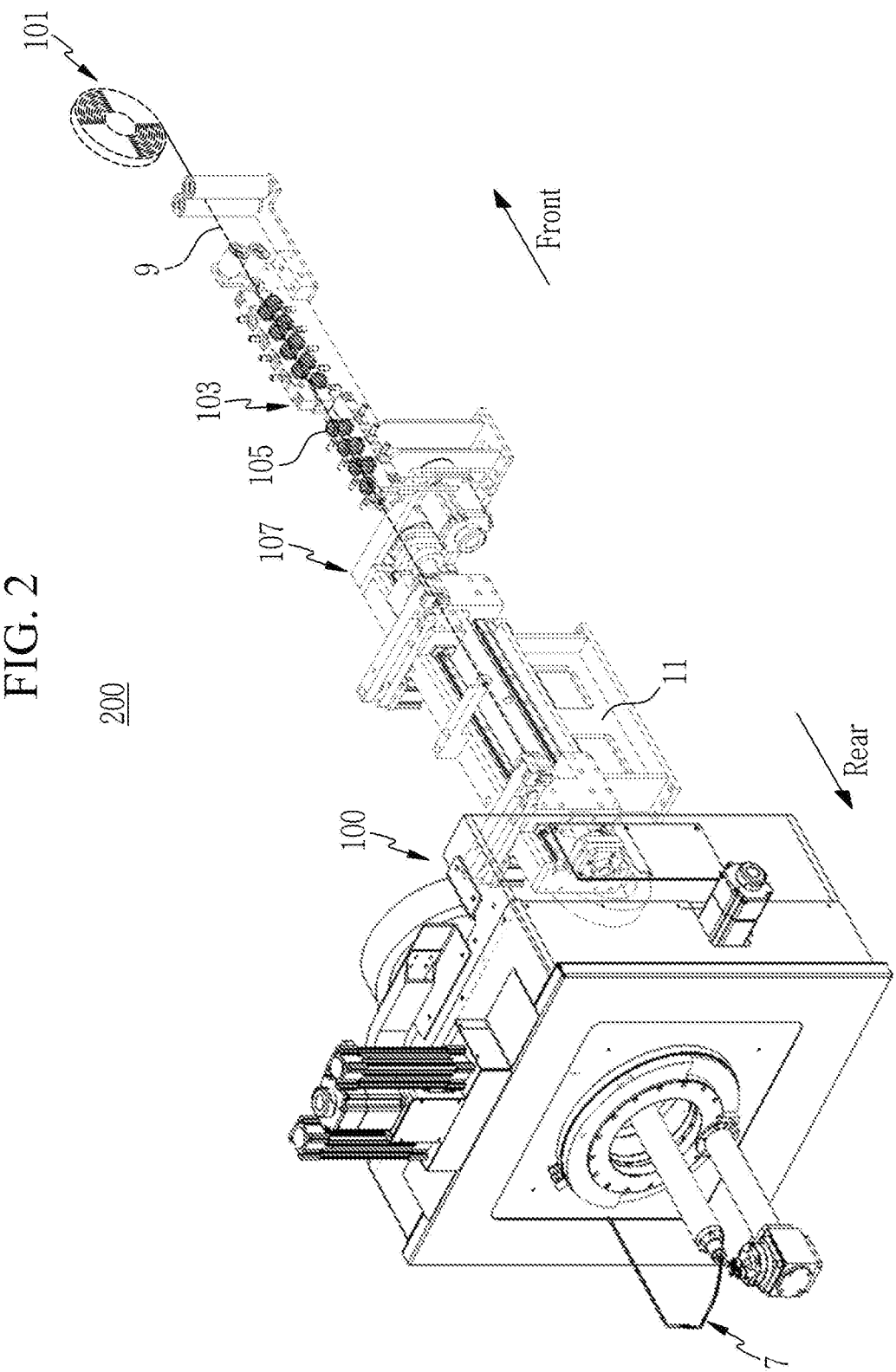
FIG. 2 is a view showing a hairpin type stator coil forming system applied to an embodiment of the present disclosure.

FIG. 2 is a view showing a hairpin type stator coil forming system applied to an embodiment of the present disclosure.

Referring to FIG. 2, the coil supply device 107 according to an exemplary embodiment of the present disclosure may be applied to the coil forming system 200 for forming the hairpin type stator coil 7 in the process of assembling the drive motor having a stator 1 (see FIG. 1) of the hairpin winding type as described above.

The coil forming system 200 according to an example includes a coil unwinder 101, a coil straightener 103, a coil supply device 107, and a coil banding device 100.

The coil forming system 200 unwinds the square material coil 9 wound around the coil unwinder 101, flattens the material coil 9 through the coil straightener 103, and flattens the material. The coil 9 may be supplied to the coil banding device 100 through the coil supply device 107.

Here, the coil straightener 103 flattens the material coil 9 through the flattening rollers 105, so that the material coil 10 can be straightened along the vertical/horizontal direction.

The coil supply device 107 is for transferring the material coil 10 to be banded by the coil banding device 100 according to an exemplary embodiment of the present disclosure to the coil banding device 100 along a set path.

That is, the coil supply device 107 serves to transfer the supplied material coil 9 in the traveling direction.

The coil supply device 107 is installed on a base frame (not shown in the drawing), and is configured between the coil straightener 103 and the coil banding device 100 along the front-rear direction on the base frame.

And the coil banding device 100 according to an exemplary embodiment of the present disclosure can be formed by banding the material coil 9 transferred through the coil supply device 107 into a set shape.

Hereinafter, the coil unwinder 101 side is defined as the front side, the coil banding device 100 side is defined as the rear side, and the front-rear direction is set as a reference direction. Then, the upper part is defined as the upper, upper end, upper surface and upper end part, and the lower part is defined as the lower, lower end, lower surface and lower part.

That is, it will be defined as being moved from front to rear based on the direction in which the material coil 9 is moved.

Further, the end (one side/one side end or the other side/one side end) in the following may be defined as either end, and a portion including the end (one side/one side end or the other side/one side end).

Figure 3:
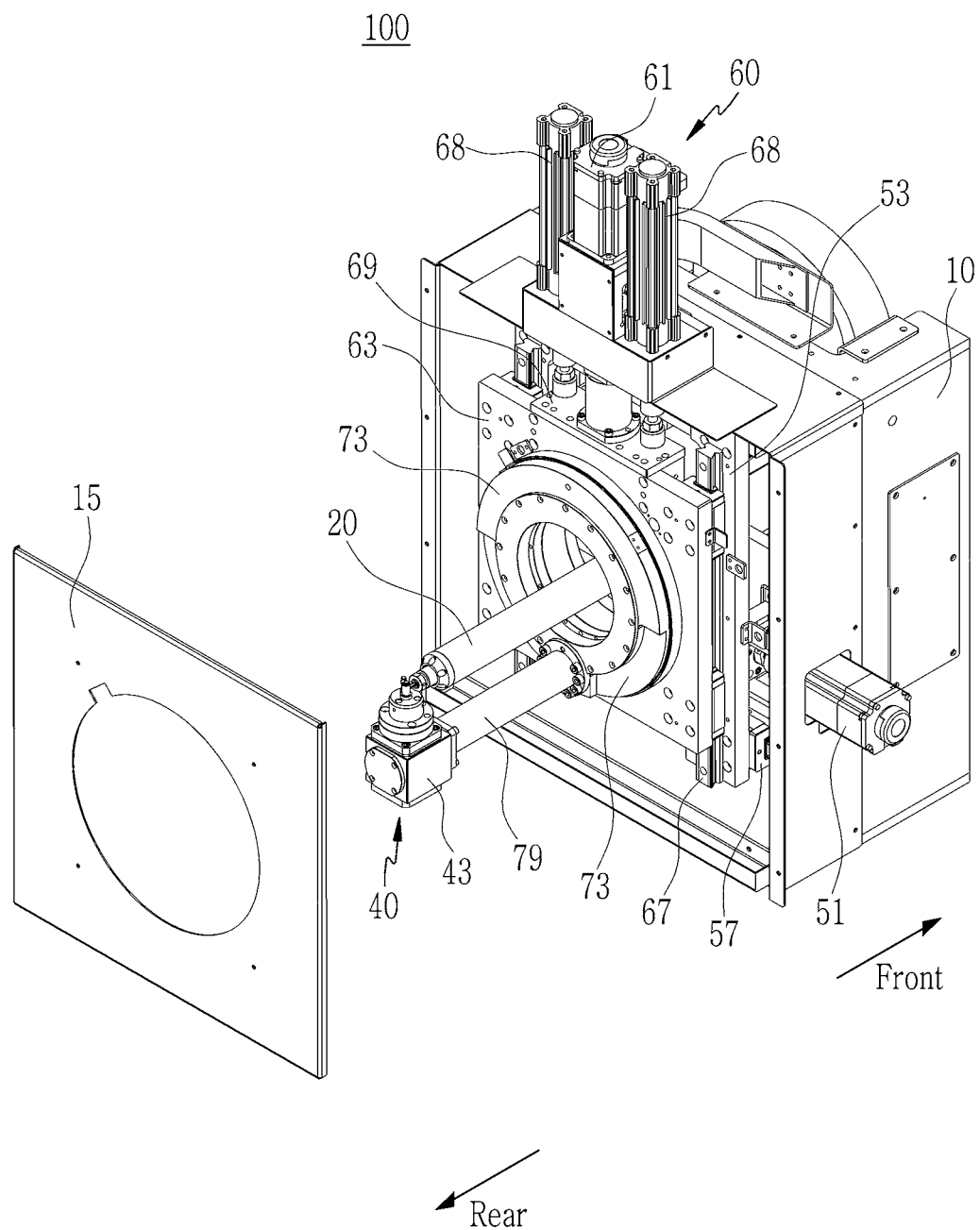
FIG. 3 is a perspective view of a coil banding device for hairpin type stator coil forming system according to an embodiment of the present disclosure.
Figure 4:
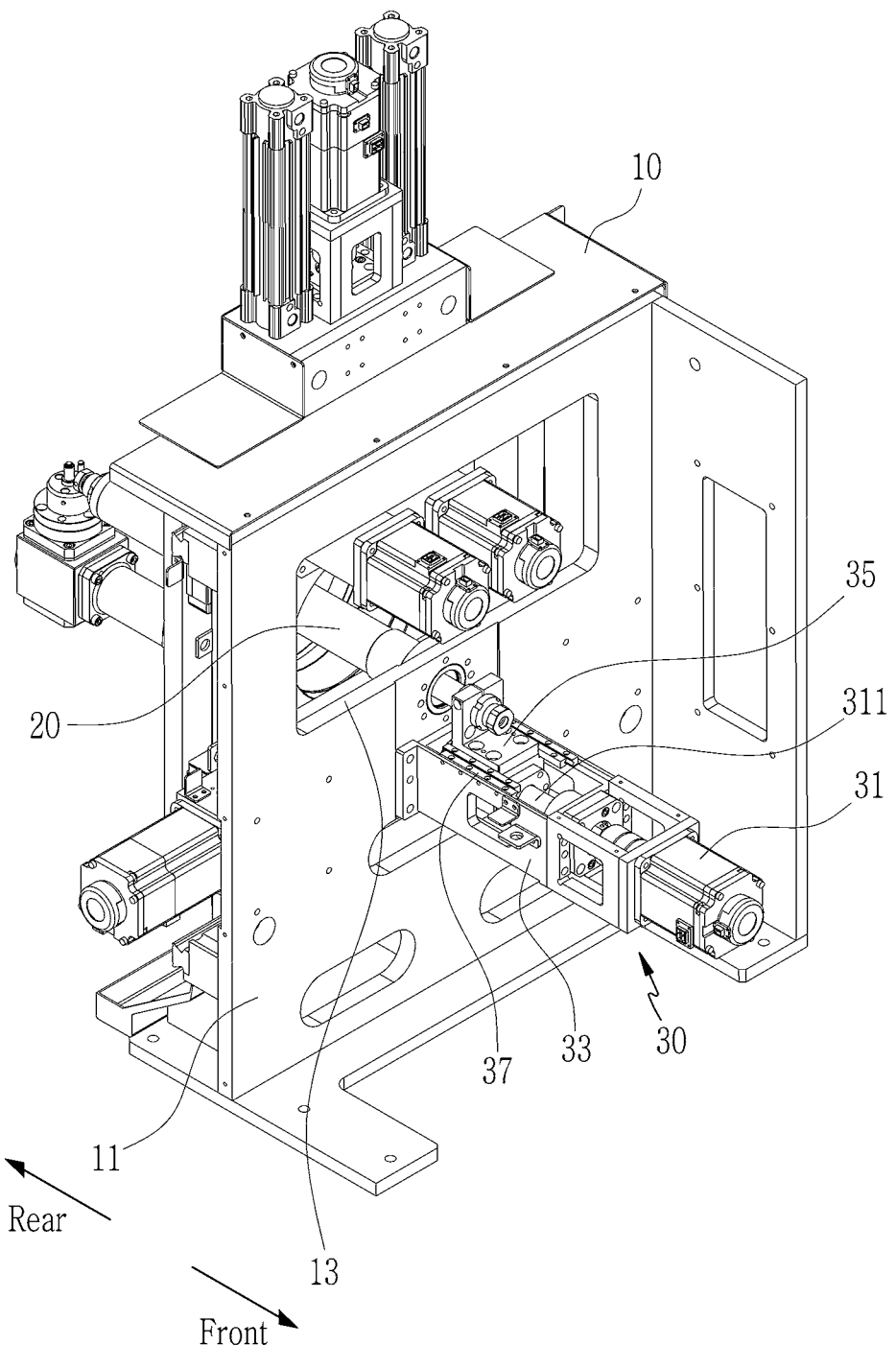
FIG. 4 is a configuration diagram showing a nozzle moving means applied to a coil banding device for hairpin type stator coil forming system according to an embodiment of the present disclosure.

FIG. 3 is a perspective view of a coil banding device for hairpin type stator coil forming system according to an embodiment of the present disclosure, and FIG. 4 is a configuration diagram showing a nozzle moving means applied to a coil banding device for hairpin type stator coil forming system according to an embodiment of the present disclosure.

Referring to FIG. 3, in an exemplary embodiment of the present disclosure, the coil banding device 100 includes a nozzle 20, a nozzle moving means 30 for moving the nozzle 20, a banding means 40, a horizontal moving means 50 for moving the banding means 40, a vertical moving means 60, a first rotating means 70, and a second rotating means 80.

The coil banding device 100 is made of a structure in which all of the parts are mounted on a rectangular shaped housing 10.

The housing 10 has opened front and rear surfaces, a partition 11 formed therein, and a first through hole 13 formed in the partition 11.

A cover 15 is mounted on the rear surface of the housing 10.

In addition, the nozzle 20 is disposed to penetrate the horizontal center portion of the housing 10.

The nozzle 20 is made of a hollow tubular inside so that the material coil 9 is supplied through the inside.

In addition, the nozzle 20 may be configured with a cutter knife (not shown) to cut the coil 9 of the material that has been subjected to the banding molding at the front end.

The front end of the nozzle 20 is fitted and supported by the partition wall 11.

Referring to FIG. 4, in an exemplary embodiment of the present disclosure, the nozzle moving means 30 is configured on the front side of the nozzle 20 and is configured to move the nozzle 20 in the forward and backward directions.

The nozzle moving means 30 includes a moving means bracket 33 mounted on the partition 11 on the front side of the housing 10.

A moving means actuator 31 for actuating the moving means is mounted on the moving means bracket 33.

In addition, a connecting bracket 35 is mounted on the drive shaft 311 of the moving means actuator 31. The connecting bracket 35 connects the nozzle 20 and the drive shaft 311, and is slidably mounted on the moving means bracket 33 through a connecting rail 37.

For example, the drive shaft 311 of the moving means actuator 31 may be formed as a linear guide.

The nozzle moving means 30 is configured to change the front and rear positions of the nozzle 20 while the connecting bracket 35 connected to the drive shaft 311 of the moving means actuator is moved along the moving means bracket 33 through the connecting rail 37 by the operation of the moving means, actuator 31.

Figure 5:
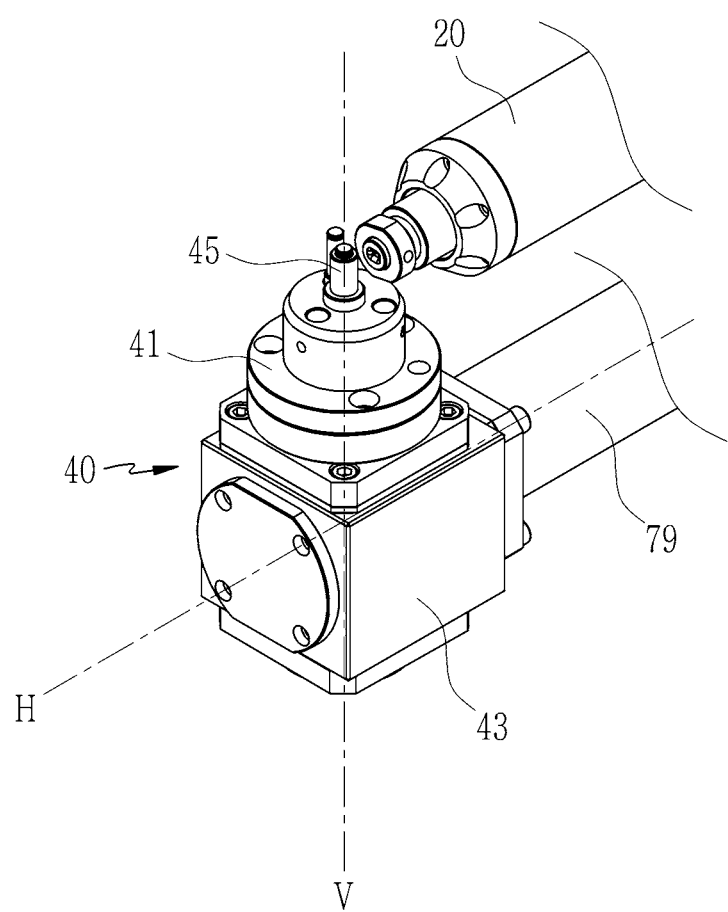
FIG. 5 is a configuration diagram showing a banding means applied to a coil banding device for hairpin type stator coil forming system according to an embodiment of the present disclosure.

FIG. 5 is a configuration diagram showing a banding means applied to a coil banding device for hairpin type stator coil forming system according to an embodiment of the present disclosure.

Referring to FIG. 5, in an exemplary embodiment of the present disclosure, the banding means 40 is mounted on the outside of the housing 10, and is configured to correspond to the rear end of the nozzle 20.

The banding means 40 includes a rotating member 41 rotating about a vertical axis V and a pair of roller members 45 mounted on the upper surface of the rotating member 41.

At this time, the rotating member 41 is rotated on the basis of the vertical axis V with respect to the rotating member housing 43, in a state where the lower predetermined section is enclosed by the rotating member housing 43.

Alternatively, the rotating member 41 may be configured to move in the arc direction with respect to the horizontal axis H along with the rotating member housing 43.

The banding means 40 has a structure in which the material coil 9 passing through the nozzle 20 is interposed between the roller members 45 to be molded.

Figure 6:
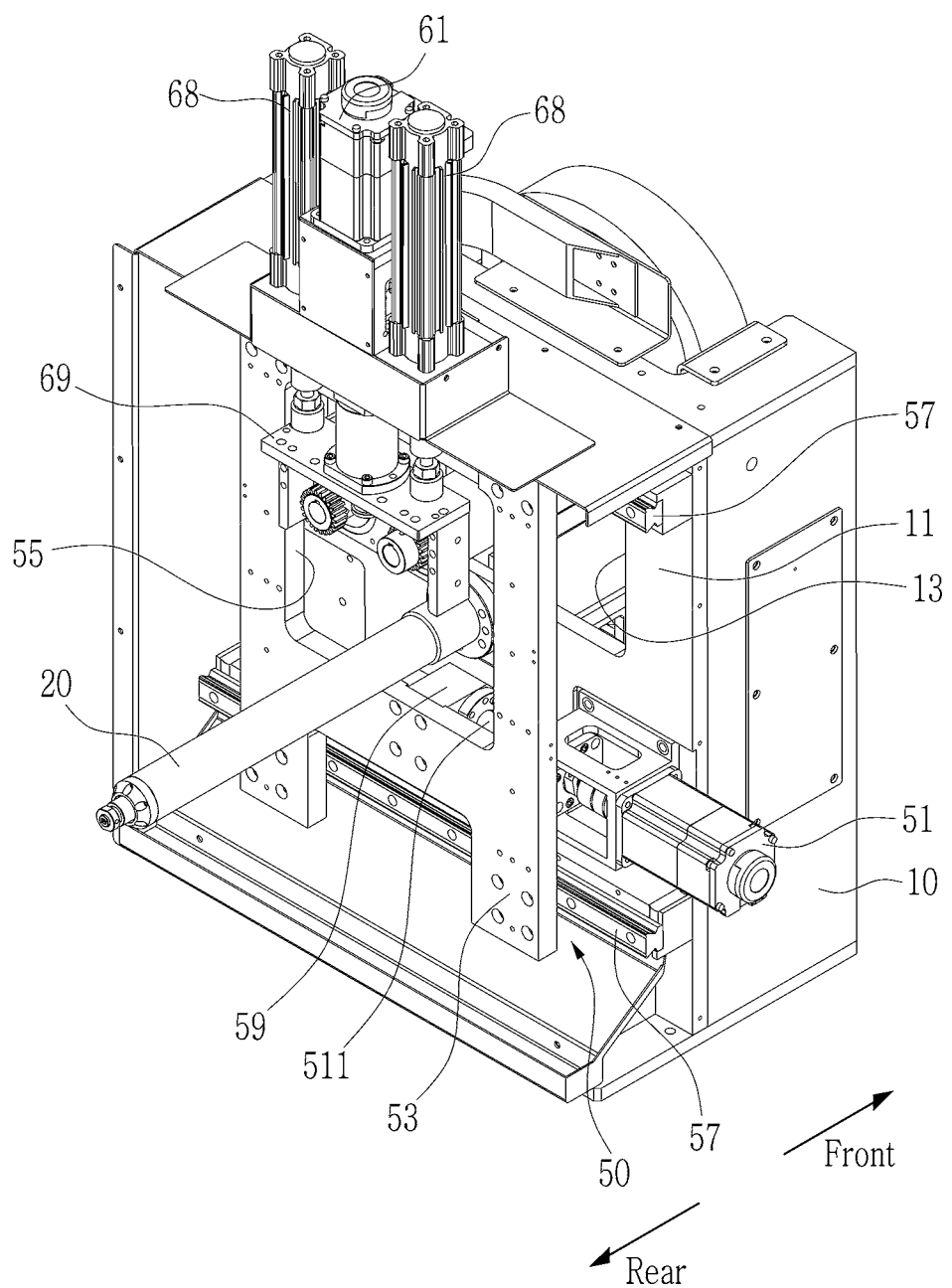
FIG. 6 is a configuration diagram showing a horizontal moving means applied to a coil banding device for hairpin type stator coil forming system according to an embodiment of the present disclosure.

FIG. 6 is a configuration diagram showing a horizontal moving means applied to a coil banding device for hairpin type stator coil forming system according to an embodiment of the present disclosure.

Referring to FIG. 6, in an exemplary embodiment of the present disclosure, the horizontal moving means 50 is configured at the rear with respect to the partition wall 11 of the housing 10.

The horizontal moving means 50 includes a first plate 53 mounted to the partition wall 11 to be slidably moved in the left and right directions.

The first plate 53 is slidably mounted on the partition wall 11 through the upper and lower rails 57.

The first plate 53 is formed with a second rectangular through hole 55 corresponding to the first through hole 13 of the partition 11.

At this time, the nozzle 20 supported on the partition 11 through the second through hole 55 is disposed through.

In addition, the first plate 53 is connected to the first actuator 51 in a state mounted on the partition wall 11 through the upper and lower rails 57.

The first actuator 51 is connected to the first plate 53 through a fixing block 59 connected to the front end of the drive shaft 511.

That is, the first plate 53 is mounted to be able to slide in the horizontal (left and right) direction through the upper and lower rails 57 in the state connected to the first actuator 51 through the fixing block 59.

For example, the drive shaft 511 of the first actuator may be a linear guide.

The horizontal moving means 50 has a structure in which the first plate 53 connected to the drive shaft 511 of the first actuator moves in the left and right directions by the operation of the first actuator while changing the position of the banding means 40 in the left and right directions.

Figure 7:
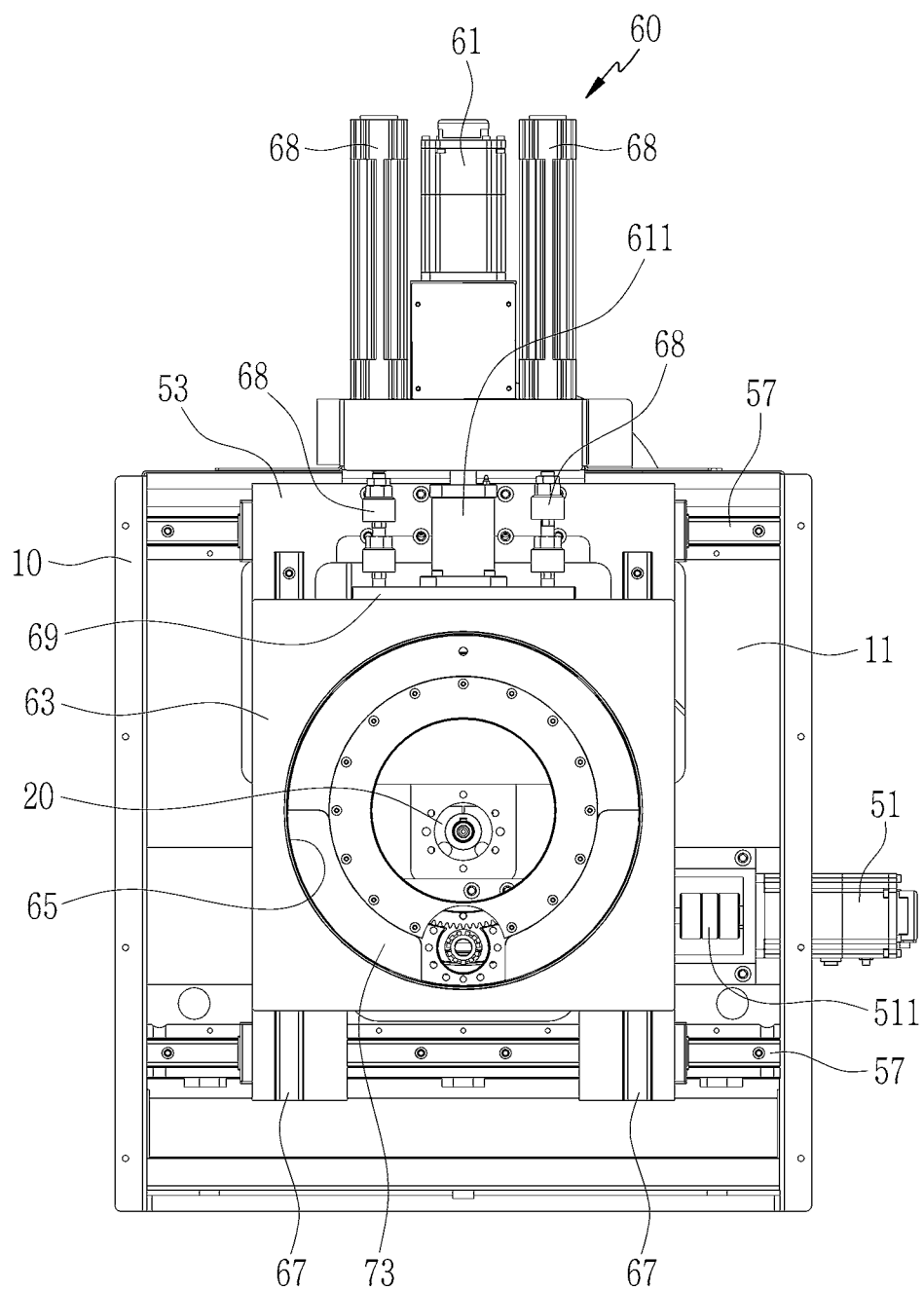
FIG. 7 is a configuration diagram showing a vertical moving means applied to a coil banding device for hairpin type stator coil forming system according to an embodiment of the present disclosure.

FIG. 7 is a configuration diagram showing a vertical moving means applied to a coil banding device for hairpin type stator coil forming system according to an embodiment of the present disclosure.

Referring to FIG. 7, in an exemplary embodiment of the present disclosure, the vertical moving means 60 is configured at the rear with respect to the first plate 53 of the horizontal moving means 50.

The vertical moving means 60 includes a second plate 63 that is slidably mounted in the up and down direction to the first plate 53.

The second plate 63 is mounted to the first plate 53 so as to be able to slide in the vertical direction through the left and right rails 67.

A circular third through hole 65 is formed in the central portion of the second plate 63.

At this time, the nozzle 20 supported on the partition 11 through the third through hole 65 is disposed therethrough.

In addition, the second plate 63 is connected to the second actuator 61 while being mounted on the first plate 53 through the left and right rails 67.

The second actuator 61 is disposed above the housing 10 and is connected to the second plate 63 through the drive shaft 611 of the second actuator.

At this time, the second plate 63 is connected to the drive shaft 611 of the second actuator through a mounting bracket 69.

That is, the second plate 63 is supported on the left and right rails 67 and is slidably mounted in the up and down directions in a state connected to the second actuator 61 through the mounting bracket 69.

For example, the drive shaft 611 of the second actuator may be a linear guide.

In addition, the vertical moving means 60 includes auxiliary cylinders 68 configured on both sides of the second actuator 61.

The auxiliary cylinder 68 together with the second actuator 61 imparts driving force to the second plate 63 in the up and down directions.

That is, the auxiliary cylinder 68 is to assist the second actuator 61 to easily slide the second plate 63 in the vertical direction.

In the vertical moving means 60, the up and down positions of the banding means 40 are changed as the second plate 63 connected to the drive shaft 611 of the second actuator moves up and down by the operation of the second actuator 61 and the auxiliary cylinder 68.

Figure 8:
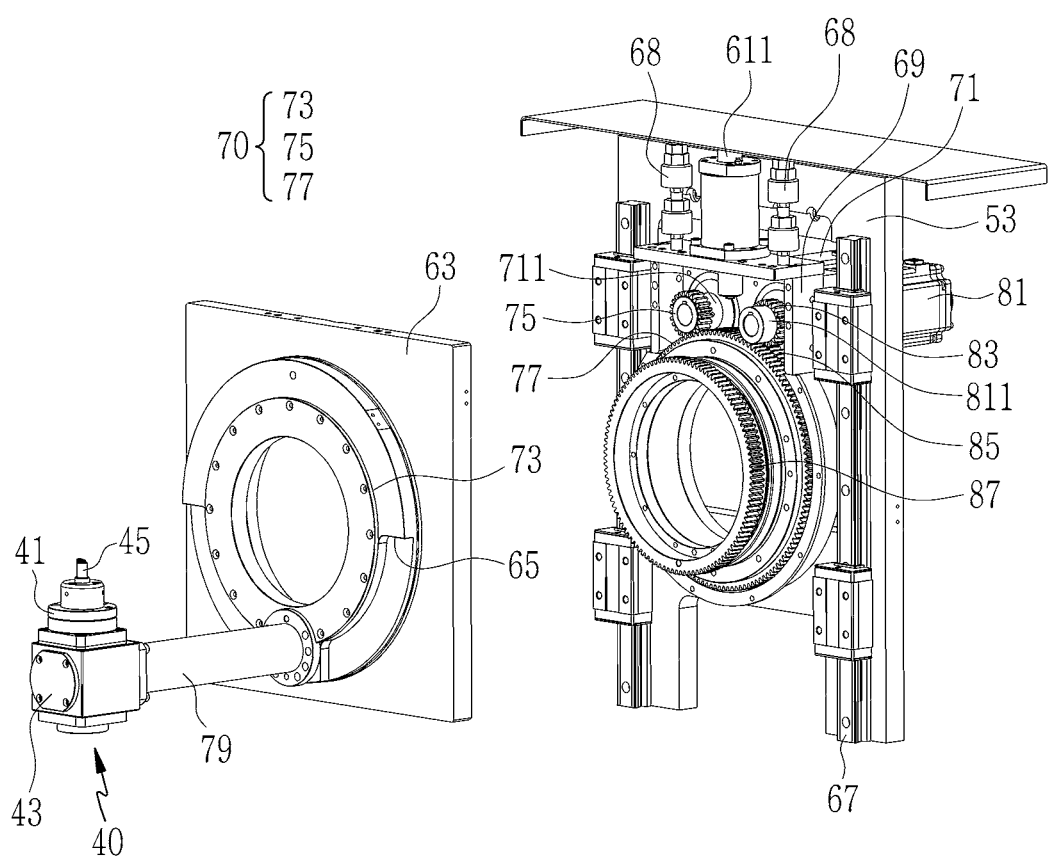
FIG. 8 is a configuration diagram showing a first rotating means applied to a coil banding device for hairpin type stator coil forming system according to an embodiment of the present disclosure.

FIG. 8 is a configuration diagram showing a first rotating means applied to a coil banding device for hairpin type stator coil forming system according to an embodiment of the present disclosure.

Referring to FIG. 8, in an exemplary embodiment of the present disclosure, The first rotating means 70 includes a first driving gear 75 driven through the third actuator 71, a first driven gear 77 engaged with the first driving gear 75, and a third plate 73 coupled to the first driven gear 77 and mounted on a third through hole 65 of the second plate 63.

The third plate 73 has a disk shape and is rotatably mounted with respect to the second plate 63.

The first driving gear 75 and the first driven gear 77 may include planetary gears having different gear diameters.

At this time, the third actuator 71 is mounted through the mounting bracket 69, and the first driving gear 75 is configured on the driving shaft 711 of the third actuator.

The first rotating means 70 is connected to the banding means 40 and the rotating means housing 79.

The rotating means housing 79 has one end coupled to the rotating member housing 43 of the banding means 40, and the other end coupled to the third plate 73.

That is, the rotating means housing 79 is to connect the banding means 40 and the third plate 73 to transmit the driving force of the third actuator 71 to the banding member 40.

In addition, in the first rotating means 70, a third actuator 71 is mounted through a mounting bracket 69, the third plate 73 and the first driven gear 77 is mounted. Therefore, when the vertical moving means 60 is moved, it moves together with the first rotating means 70.

In the first rotating means 70, the first driving gear 75 and the first driven gear 77 rotate by the operation of the third actuator 71. Then, the third plate 73 coupled to the first driven gear 77 is rotated. At the same time, the rotating means housing 79 and the banding means 40 coupled to the third plate 73 are moved in the arc direction with respect to the horizontal axis.

Figure 9:
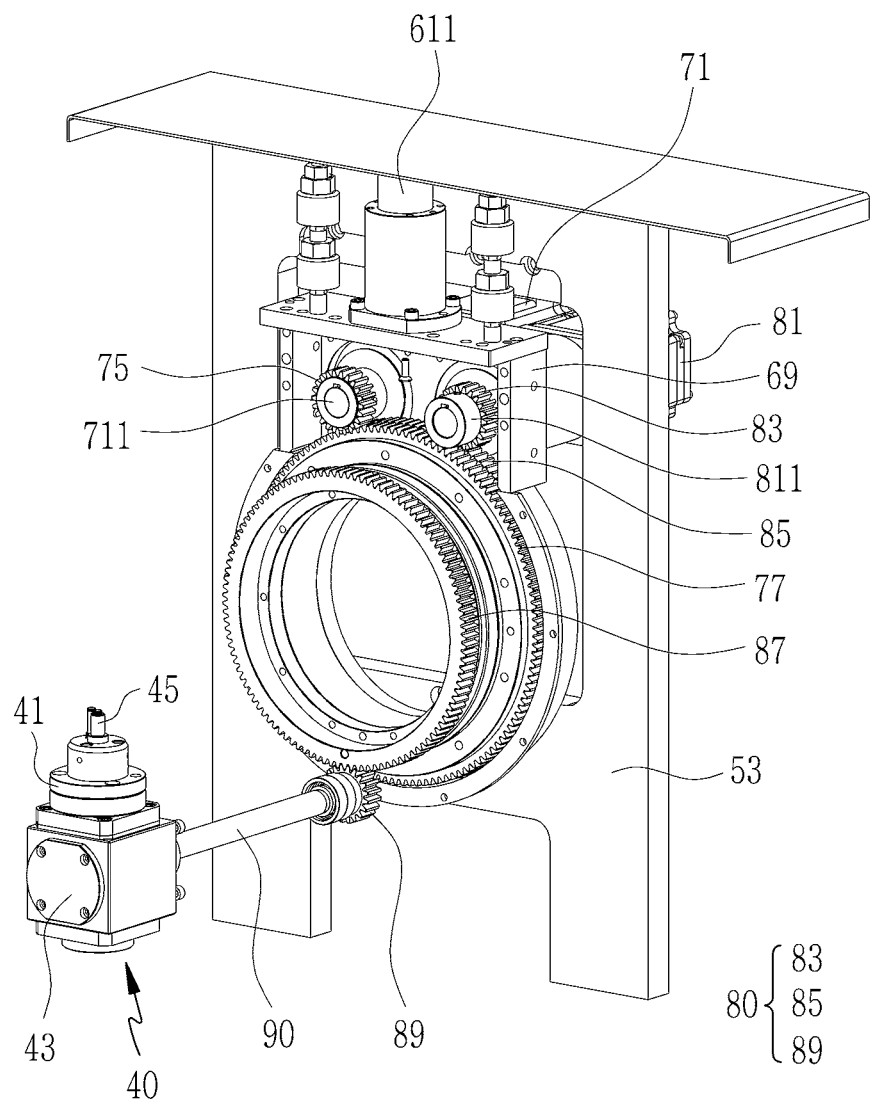
FIG. 9 is a configuration diagram showing a second rotating means applied to a coil banding device for hairpin type stator coil forming system according to an embodiment of the present disclosure.
Figure 10:
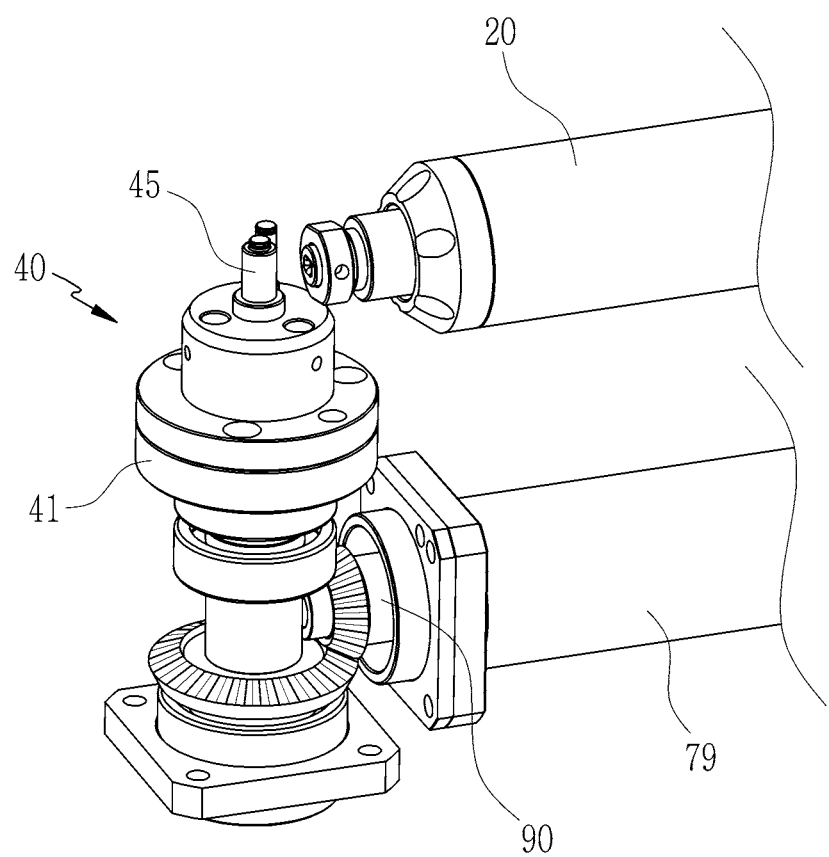
FIG. 10 is a configuration diagram showing a connection between the second rotating means and the banding means applied to a coil banding device for hairpin type stator coil forming system according to an embodiment of the present disclosure.

FIG. 9 is a configuration diagram showing a second rotating means applied to a coil banding device for hairpin type stator coil forming system according to an embodiment of the present disclosure, and FIG. 10 is a configuration diagram showing a connection between the second rotating means and the banding means applied to a coil banding device for hairpin type stator coil forming system according to an embodiment of the present disclosure.

Referring to FIG. 9, in an exemplary embodiment of the present disclosure, the second rotating means 80 includes a second driving gear 83 driven through the fourth actuator 81, a second driven gear 85 engaged with the second driving gear 83, and a sub-driven gear 89 that is operated by the second driven gear 85 and is coupled to the rotating member 41 of the banding means 40.

At this time, the second driven gear 85 is integrally formed with a connected driven gear 87 having a small diameter toward its rear.

The connection driven gear 87 is formed integrally with the second driven gear 85 and is directly engaged with the sub driven gear 89 in a state penetrated inside the first driven gear 77.

The second driving gear 83, the second driven gear 85, the connected driven gear 87, and the sub driven gear 89 may comprise planetary gears having different gear diameters.

In addition, the fourth actuator 81, like the third actuator 71, is mounted through the mounting bracket 69, and the second drive gear 83 described above on the drive shaft 811 of the fourth actuator is composed.

The second rotating means 80 is connected to the banding means 40 and the horizontal driving unit 90.

The horizontal drive unit 90 is disposed inside the rotating means housing 79, one end of which passes through the rotating member housing 43 and is coupled with the rotating member 41 of the banding means 40, and the sub driven gear 89 is coupled to the other end.

That is, the horizontal driving unit 90 serves to transmit the driving force of the fourth actuator 81 to the banding means 40.

In addition, the second rotating means 80 has a structure in which the fourth actuator 81 is mounted through the mounting bracket 69 and the second driven gear 85 is mounted on the second plate 63. When the vertical moving means 60 is moved, they move together.

In the second rotating means 80, the second driving gear 83, the second driven gear 85, and the connected driven gear 87 are rotated by the operation of the fourth actuator 81, and the sub driven gear 89 meshed with the connected driven gear 87 is rotated. At the same time, the banding means 40 coupled to the horizontal drive unit 90 is rotated based on the vertical axis V.

At this time, referring to FIG. 10, the rotational force of the second rotating means 80 is transmitted to the banding member 40 through a bevel gear (not shown) between one end of the horizontal driving unit 90 and the rotating member 41.

Accordingly, the coil banding device 100 for hairpin type stator coil forming system according to an exemplary embodiment of the present disclosure can improve process flexibility compared to the existing press forming method through individual position control of the nozzle and the banding means for forming the material coil.

In addition, the coil banding device 100 for hairpin type stator coil forming system according to an exemplary embodiment of the present disclosure simplifies a structure for controlling the position of the nozzle and the banding means and can be applied regardless of the shape and type of the stator coil, thereby reducing investment and process cost.

In addition, the coil banding device for hairpin type stator coil forming system according to an exemplary embodiment of the present disclosure can minimize the number of gear overlaps to minimize the backlash of gears, and by reducing the backlash, it is possible to precisely mold the material coil to improve the productability.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A coil banding device that bands a square shaped material coil into a set shape in a hairpin type stator coil forming system, comprising:
   a housing;
   a tubular nozzle disposed to penetrate a central portion of a horizontal direction of the housing, a material coil is supplied through an interior of the tubular nozzle;
   a nozzle moving member connected to one end of the tubular nozzle configured to move the tubular nozzle in one direction;
   a banding member including a pair of roller members on an upper surface of a rotating member, the rotating member being disposed on an other end of the tubular nozzle, and the pair of roller members sandwiching the material coil discharged from the tubular nozzle therebetween to band in a set shape;
   a horizontal moving member connected to a first actuator for moving the banding member in a horizontal direction through a first plate which is slidably mounted to the housing;
   a vertical moving member connected to a second actuator for moving the banding member in a vertical direction through a second plate which is slidably mounted on the first plate;
   a first rotating member adapted to rotate the banding member with respect to a horizontal axis through a third plate which is rotatably mounted on the second plate; and
   a second rotating member adapted to rotate the banding member about a vertical axis comprising a planetary gear mounted on the second plate.

2. The coil banding device for the hairpin type stator coil forming system of claim 1, wherein the interior of the tubular nozzle comprises a hollow cylinder.

3. The coil banding device for the hairpin type stator coil forming system of claim 1, wherein the nozzle moving member includes:
   a moving member bracket configured on the front side of the housing;
   a moving member actuator mounted on the moving member bracket; and
   a connecting bracket mounted between a drive shaft of the moving member actuator and the front end of the tubular nozzle and configured to slide the tubular nozzle forward and backward along a connecting rail on the moving member bracket.

4. The coil banding device for the hairpin type stator coil forming system of claim 1, wherein the banding member includes:
   the rotating member connected to a driving unit adapted to rotate about a vertical axis;
   a rotating member housing surrounding a section of the rotating member; and
   the pair of roller members disposed corresponding to the outlet of the tubular nozzle through which the material coil is discharged, and the pair of roller members sandwiching the material coils therebetween the to form a band mounted on the upper surface of the rotating member protruding a section from the rotating member housing.

5. The coil banding device for the hairpin type stator coil forming system of claim 1, wherein the horizontal moving member includes:
   the first plate disposed at the rear of the housing and slidably mounted between the housing and upper and lower rails; and
   the first actuator mounted on the housing and connected to the first plate through a fixed block mounted on a front end of the drive shaft, wherein the first actuator moves the first plate in a horizontal direction.

6. The coil banding device for the hairpin type stator coil forming system of claim 1, wherein the vertical moving member includes:
   the second plate disposed on the rear side of the first plate and slidably mounted between the first plate and left and right rails; and
   the second actuator disposed on an upper side of the housing and connected to the second plate through a mounting bracket to move the second plate in a vertical direction.

7. The coil banding device for the hairpin type stator coil forming system of claim 6, wherein the vertical moving member further includes:
   an auxiliary cylinder connected between the housing and the mounting bracket, wherein the auxiliary cylinder applies a driving force to the second plate together with the second actuator.

8. The coil banding device for the hairpin type stator coil forming system of claim 6, wherein the first rotating member includes:
   a disc-shaped third plate rotatably mounted to a central portion of the second plate;
   the rotating member housing having one end coupled to the rotating member housing surrounding the rotating member and the other end coupled to the third plate to rotate the banding member based on a vertical axis by rotation of the third plate;
   a third actuator mounted through a mounting bracket of the vertical moving member and having a first driving gear formed at a front end; and
   a first driven gear engaged with the first driving gear and coupled to the rear side of the third plate to rotate with the third plate by the first driving gear.

9. The coil banding device for the hairpin type stator coil forming system of claim 8, wherein as the third actuator operates, the first driven gear engaged with the first driving gear, the third plate coupled to the first driven gear, the rotating member housing coupled to the third plate, and the rotating member housing rotate so that the banding member is moved relative to the horizontal axis.

10. The coil banding device for the hairpin type stator coil forming system of claim 8, wherein:
the first driving gear and the first driven gear are planetary gears having different gear diameters.

11. The coil banding device for the hairpin type stator coil forming system of claim 8, wherein the second rotating member includes:
a horizontal driving unit disposed inside the rotating member housing, one end of the horizontal driving unit being passed through the rotating member housing and coupled with the rotating member, and connected to a sub driven gear at the other end of the horizontal driving unit;
a fourth actuator mounted through the mounting bracket and having a second driving gear formed at the front end;
a second driven gear engaged with the second driving gear and disposed in front of the first driven gear; and
a connecting driven gear formed smaller than the diameter of the second driven gear at the rear of the second driven gear, integrally formed with the second driven gear and penetrated inside the first driven gear, and engaged with the sub driven gear.

12. The coil banding device for the hairpin type stator coil forming system of claim 11, wherein the second rotating member rotates the banding member about a vertical axis as the fourth actuator operates, while the horizontal driving unit rotates by the second driven gear engaged with the second driving gear, the connecting driven gear integrally formed with the second driven gear, and the sub driven gear engaged with the connecting driven gear.

13. The coil banding device for the hairpin type stator coil forming system of claim 11, wherein the second driving gear, the second driven gear, the sub driven gear, and the connecting driven gear are planetary gears having different gear diameters.

* * * * *